United States Patent Office 3,058,858
Patented Oct. 16, 1962

3,058,858
COMPOSITE POLYESTER PROPELLANT CONTAINING A SILICON COMPOUND AS BURNING RATE CATALYST
George W. Batchelder and Gilbert A. Zimmerman, Monrovia, Calif., assignors to Aerojet General Corporation, Azusa, Calif., a corporation of Ohio
No Drawing. Filed July 29, 1953, Ser. No. 371,172
13 Claims. (Cl. 149—19)

This invention relates to solid propellants useful for rocket jet propulsion and has for its object to improve and increase the burning rates of such propellants.

In the operation of jet motors it is customary to burn solid propellant charges in the motor chambers to produce gas under pressure which escapes as high velocity gas, generally through an exhaust nozzle leading from the chamber, thereby producing a resultant thrust.

In accordance with the present invention we incorporate into the propellant composition a burning rate acceleration catalyst. Such catalyst is preferably introduced in finely divided form or dispersed into the propellant in a liquid state at the same time that the oxidizer is incorporated therein. The entire substance including the oxidizer and catalyst in the liquid or solid form is then cured by causing the resin fuel binder to polymerize.

Substances useful for the acceleration catalyst are silicone and titanium compounds capable of yielding oxides of those elements upon heating. The oxides thus formed are believed to act as cracking catalysts for the combustibles and provide increased surface area, thereby increasing the mixing rate of the liberated gases, thus effectively increasing the overall burning rate of the propellant as much as 100% in some cases.

Substances which are useful as catalysts for improving the burning rate are the lower alkyl silicones such as methyl, ethyl, propyl, isopropyl, etc., silicones. The particular organic radicals are of little importance since the active groupings useful for the catalytic purpose are the

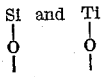

radicals. The silicones have varying degrees of consistency and are capable of some polymerization. The more polymerized they are the more viscous they become.

Other silicone compounds suitable for this purpose are lower alkyl ortho silicates such as methyl, ethyl, propyl, isopropyl, etc. silicates; as well as inorganic silicates such as calcium silicate, diatomaceous earth, silica gel, amine treated clay, and bentonite clay treated with aliphatic amines. In addition, lower alkyl and lower alkoxy siloxanes are also found to be useful.

Titanium compounds found to be useful for this purpose are the lower alkyl titanates.

Mixtures of these compounds and compositions have also been found to be useful.

The burning rate acceleration catalyst is present preferably in an amount of from about 0.5% to 5.0% by weight of the total propellant composition. Optimum results are obtained in the range of from about 1.0 to 2.0% by weight.

The solid propellant charge usually comprises an intimate mixture of finely divided oxidizer, uniformly distributed in a resinous binder which acts as a fuel. The resin is preferably comprised of a polyester component, that is, a condensation product of a polybasic carboxylic acid and a polyhydric alcohol in which there is incorporated a monomeric olefinic component.

Suitable oxidizers are inorganic salts, as for example: lithium, sodium, potassium, rubidium, cesium, as well as ammonium and hydrazine salts of chromates, dichromates, permangates, nitrates, chlorates, and perchlorates.

The polyester component, sometimes known as the alkyd component or alkyd resin, ordinarily possesses some degree of unsaturation in the molecule in order to permit polymerization with the olefinic component and which may be for example; styrene, vinyl acetate, acrylic acid esters, methacrylic acid esters, allyl compounds such as allyl diglycol carbonate, diallyl maleate, diallyl glycollate, and other unsaturated components such as propylene, butadiene, acetylene, etc.; as well as derivatives of any of the above substances which are capable of polymerization with the resin. In general any olefin compatible with the resin and which will polymerize with it is suitable. This includes all unsubstituted olefins and in addition many substituted olefins. The unsaturation present in the polyester permits the resulting unsaturated polyester to polymerize with the double bond in the vinyl, allyl, or other olefinic additives. When a sufficient amount of cross-linkage occurs the resin becomes thermosetting. With a lesser degree of cross-linkage the resin may be thermoplastic; and in some cases the resin possesses properties of both thermoplastic and thermosetting resins. All of these types of resins are within the purview of the present invention.

The polyester component can be made in general as follows: The hydroxy groups of dihydric or polyhydric alcohols are permitted to condense, in the presence of the monomeric vinyl, allyl or other olefinic component, with the polycarboxylic groups of, for example, a dicarboxylic acid, or a mixture of dicarboxylic acids, thereby producing an unsaturated polyester. The unsaturation permitting the polyester to polymerize with the monomeric vinyl, allyl or other olefinic component may be supplied by employing either an unsaturated polyhydric alcohol or an unsaturated dicarboxylic acid. The usual and preferred manner is to condense mixtures of an unsaturated polycarboxylic acid or anhydride with a saturated or aromatic polycarboxylic acid, or anhydride, with a polyhydric alcohol. The percentage of the unsaturated acid or anhydride should be sufficient to permit the necessary amount of copolymerization between the vinyl, allyl or other olefinic additive and the polyester. The polyester may be present in amounts varying between 10% and 70% by weight based on the weight of the polyester-olefinic additive mixture. However, in general 50% by weight of polyester to 50% by weight of the olefinic additive produces a satisfactory polyester resin type of matrix for the propellant.

The alcohols that can be used are not limited, however, to the dihydric alcohols, as other polyhydric alcohols, such as the trihydric and higher polyhydric alcohols may be used. These afford additional possibilities for cross-linking and as a consequence the toughness and brittleness of the final resin may be controlled as desired.

For the polyhydric alcohol component any of the following alcohols may be used: dihydric alcohols, such as ethylene glycol, diethylene glycol, triethylene glycol, propylene glycol; a trihydric alcohol such as glycerol; tetrahydric alcohols such as the erythritols and pentaerythritol; pentitols which inclue arabitol, adonitol, xylitol; hexitols including mannitol, sorbitol, dulcitol; heptitols such as persitol and volamitol, etc., or mixtures of any of the above alcohols may also be employed if desired.

Saturated polycarboxylic acids useful in compounding the polyester resins are, for example, the aliphatic dibasic acids, including: oxalic, malonic, succinic, glutaric, adipic, pimelic, sebacic, azelaic acids, etc., and the unsaturated carboxylic acids useful as the acidic components in forming polyester resins are: maleic acid fumaric acid, citraconic acid, mesaconic acid, itaconic acid, etc. The anhydrides such as itaconic anhydride may likewise be used for supplying the desired unsaturation.

Regardless of which of the saturated acids are used, the degree of unsaturation necessary to provide cross linkage with the vinyl, allyl, or other olefinic components, may be obtained by the addition of any of the above-named unsaturated acids or their anhydrides.

The propellant composition commonly comprises a uniform dispersion of a finely divided oxidizer in a polyester resin matrix of the type described above. The resin acts as a binder, and regardless of substituents in the molecule, will serve as a fuel when the propellant contains a sufficient amount of oxidizer to insure the necessary oxidation of the organic material. The oxidizer should ordinarily be supplied in sufficient quantity to oxidize all of the carbon to carbon monoxide and ⅓ of the hydrogen to water.

A useful form of the condensation product for use as the fuel component in the propellant is the reaction product of sebacic acid and a polyhydric alcohol such as propyleneglycol to which there has been added a small amount of unsaturated acid anhydride such as maleic anhydride.

The percentage of unsaturation in the polyhydric alcohol-polycarboxylic acid mixture to form the polyester should be between about 2 and 100% by weight based on the weight of the total polycarboxylic acid or polycarboxylic acid mixture. The preferred percentage of unsaturation is between about 10% and 20% by weight based on the weight of the acidic component. Although the polyhydric alcohol and polycarboxylic acid will react in stoichiometric proportions, nevertheless, it is usually better practice to use a quantity in excess of the stoichiometric amount; and subsequently remove the excess alcohol from the resultant polyester, in order to obtain a final product substantially free of impurities.

A particular form of a polymerizable mixture useful as a propellant comprises 4 moles of sebacic acid, 1 mole of maleic anhydride and 5 moles of propylene glycol. Such an alkyd resin is available commercially and is hereafter referred to as "Resin A." A related product, also available commercially and hereafter referred to as "Resin B" already contains the olefinic component, namely styrene. It is a heteropolymerizable resin, compounded by mixing approximately 50% by weight of styrene with 50% by weight of Resin A.

Another such a resin, which has been found to be particularly useful, is the condensation product of adipic acid and diethylene glycol, to which there has been added a small amount of maleic anhydride. This resin hereafter referred to as Resin D is made by mixing 7 moles of adipic acid, 3 moles of maleic anhydride and 11 moles of diethylene glycol. A related resin, hereafter referred to as Resin C is made by mixing 7 moles of adipic acid, 3 moles of maleic anhydride and 12 moles of diethylene glycol. Other resins, compounded with polyhydric alcohols including any of the higher polyhydric alcohols listed above, polycarboxylic acids and their anhydrides, may also be used.

The specific resins identified above as "Resin A," "Resin C" and "Resin D" can be made to polymerize with the vinyl allyl or other olefinic type of monomers to form the desired heteropolymerized resin. The amount of olefinic monomer, may range from about 25% to about 100% by weight based on the weight of the monomer-resin mixture, and the amount of the monomer to be used in each case is determined by the particular properties which are desired in the finished resin. The olefinic monomers listed above are all liquids and thereby serve as solvents for the heavier alkyd resin, thus facilitating the dispersion of the oxidizer throughout the liquid resin before curing.

The oxidizer may be any stable, solid inorganic oxidizer. The term oxidizer as used herein means a substance which gives up free oxygen which becomes available for combustion or reaction with the fuel component. The oxidizer is a substance which might be incorporated in the polyester resin unsaturated polycarboxylic-olefinic monomer mixture by stirring and mixing. Preferably the oxidizer is added to the mixture while the resin is in its liquid state. The selection of the oxidizing material depends upon the type of propellant and the specific burning properties desired. The preferred oxidizers are the perchlorates, especially the perchlorates of potassium and ammonium. The amount of oxidizer added to the resinous mixture usually lies between 45% and 90% by weight of the total propellant composition and the weight of the polyester resin-unsaturated polycarboxylic-olefinic monomer mixture should lie between 55% and 10% of the same propellant composition.

The propellant is preferably compounded as follows: The oxidizer required to oxidize the fuel to the proper degree is uniformly stirred into the liquid polester resin-olefinic monomer mixture. Stirring is continued at room temperature until all of the oxidizer has been added and the mixture has a uniform consistency. A catalyst capable of accelerating polymerization of the resin mixture is added thereto and intimately incorporated therein before or at the time the oxidizer is added. In the same fashion the burning rate expediting catalyst of the present invention is added to the monomer in finely divided form. All of these substances including the oxidizer are thoroughly mixed with the liquid monomer and the resultant mixture is then cast into a suitable mold and the propellant substance cured.

The cast propellant is generally cured at temperatures ranging from ambient to about 220° F. When lower temperatures are employed the charge requires considerable time to cure. If shorter cure times are desired a more elevated temperature can be used. The time and temperature for curing makes no substantial difference in the ultimate product in so far as its ballistic properties are concerned.

A series of silica and titanium compounds were investigated to determine their effect upon the burning rates of two representative propellant mixtures. The two propellants used therein are hereinafter designated as Propellant A and Propellant B. Their compositions by weight percent as are follows:

*Propellant A*

| | Wt. percent |
|---|---|
| Ammonium perchlorate | 75.00 |
| Polyester resin consisting of, by weight percent: | 12.35 |
|    Diethylene glycol _____ 47.0 | |
|    Adipic acid _____ 49.45 | |
|    Maleic anhydride _____ 3.55 | |
| Styrene | 12.35 |
| Lecithin | 0.05 |
| Polymerization catalysts | 0.25 |
| | 100.00 |

*Propellant B*

| | Wt. percent |
|---|---|
| Ammonium perchlorate | 85.00 |
| Polyester resin consisting of, by weight percent: | 3.58 |
|    Diethylene glycol _____ 43.0 | |
|    Adipic acid _____ 44.25 | |
|    Maleic anhydride _____ 1.75 | |
| n-Butyl acrylate | 9.33 |
| Methyl acrylate | 1.44 |
| Polymerization catalysts | 0.40 |
| Lecithin | 0.25 |
| | 100.00 |

The results of these tests are as follows:

| Catalyst | Percent Added | Propellant | Burning Rates, 1,000 p.s.i. and 60° F. in. sec.$^{-1}$ |
|---|---|---|---|
| None | | A | 0.26 |
| Ethyl Silicone | 2 | A | 0.39 |
| None | | B | 0.35 |
| Butyl titanate | 1 | B | 0.80 |
| Ethyl Silicone | 1 | B | 0.61 |
| Do | 2 | B | 0.78 |
| Ethyl Silicate | 1 | B | 0.86 |
| Ethyl Silicate condensed | 1 | B | 0.86 |
| Do | 2 | B | 0.96 |
| Ethyl Silicate 40 | 1 | B | 0.80 |
| Silicone Oil | 1 | B | 0.62 |
| Do | 2 | B | 0.81 |
| Silicone Resin | 1 | B | 0.70 |
| Calcium silicate | 1 | B | 0.55 |
| Hydrated amorphous silica | 1 | B | 0.60 |
| Silica gel | 1 | B | 0.66 |
| Bentone (bentonite clay and dodecyl amine) | 1 | B | 0.80 |
| Bentone and silicate resin | 1 | B | 0.68 |
| Bentone and bentonite clay | 1 | B | 0.80 |

It has been hypothesized that when composite propellants burn, fragments of polymerized fuel rise from the surface of the fuel binder as streams of oxidizing gases evolve from the surface of the oxidizer and that these gases then pass through a diffusion zone before reacting with each other. It is postulated that in the presence of a pyrolysis catalyst, the fuel fragments thus formed could be more quickly cracked to shorter fragments which would thus diffuse more rapidly and as a consequence bring the flame more closely to the propellant surface. The temperature of the surface being thus increased, the initial pyrolysis would be accelerated with a resultant increase in the burning rate of the propellant.

It may be observed from the foregoing table of burning rates that the burning rate has been increased by the use of siliceous catalysts in some cases more than 100%. It is evident that the catalytic behaviour of these substances is predicated upon an ability to provide the silica or titanium in the form of the oxide; thus, it is obvious that any siliceous or titanous compound capable of liberating these radicals is useful for this purpose.

From the foregoing discussion it is evident that the burning rate acceleration catalyst of the present invention will find valuable use in any gas generating propellant type composition such as nitro-cellulose base propellants and other nitro substituted resin-containing propellants.

It should be understood that the foregoing examples, although describing certain specific embodiments of the invention, are provided primarily for purposes of illustration and are not intended to impose any limitations upon its broader aspects.

We claim:

1. A solid propellant composition comprising a cured intimate mixture of a solid inorganic oxidizing salt, said inorganic oxidizing salt being present in an amount of from about 45% to 90% by weight of the total propellant composition, and from about 55% to about 10% by weight of a binder material consisting essentially of an unsaturated polyester resin consisting essentially of the condensation product of a saturated polyhydric alcohol and polycarboxylic acid heteropolymerized with an unsaturated compound selected from the group consisting of lower alkenes, lower alkynes, phenyl substituted lower alkenes, lower alkyl dienes, lower alkenyl esters of lower alkanoic acids, lower alkyl esters of lower alkenoic acids, lower alkenyl esters of lower alkenoic acids, allyl diglycol carbonate, diallyl diglycollate, and mixtures thereof; and from about 0.5% to about 5% by weight of a burning rate acceleration catalyst selected from the group consisting of lower alkyl orthosilicates, inorganic silicates, mixtures of bentonite clays with higher alkyl amines, lower alkoxy siloxanes, lower alkyl siloxanes, silica gel, lower alkyl titanates, and mixtures thereof.

2. The composition of claim 1 wherein the polyhydric alcohol component is diethylene glycol.

3. The composition of claim 1 wherein the polyhydric alcohol component is propylene glycol.

4. The composition of claim 1 wherein the burning rate acceleration catalyst is butyl titanate.

5. The composition of claim 1 wherein said solid inorganic oxidizing salt is ammonium perchlorate.

6. The composition of claim 1 wherein said solid inorganic oxidizing salt is ammonium nitrate.

7. A solid propellant composition consisting essentially of a cured intimate mixture of from about 45% to about 90% by weight of a solid, inorganic oxidizing salt; from about 55% to about 10% by weight of a binder material consisting essentially of a polyester resin consisting essentially of the condensation product of diethylene glycol, adipic acid and maleic anhydride, heteropolymerized with a mixture of n-butyl acrylate and methyl acrylate and from about 0.5% to about 5% by weight of a silicone oil burning rate acceleration catalyst.

8. A solid propellant composition consisting essentially of a cured intimate mixture of from about 45% to about 90% by weight of ammonium perchlorate and from about 55% to about 10% by weight of a polyester resin consisting of the condensation product of diethylene glycol, adipic acid, maleic anhydride, n-butyl acrylate and methyl acrylate; and ethyl silicate in an amount of about 2.0% by weight of the total propellant composition.

9. A solid propellant composition consisting essentially of from about 45% to about 90% by weight of ammonium perchlorate, from about 55% to about 10% by weight of a binder material consisting essentially of the condensation product of diethylene glycol, adipic acid and maleic anhydride, heteropolymerized with a mixture of n-butyl acrylate and methyl acrylate and from about 0.5% to about 5% by weight of the total propellant composition of ethyl silicate.

10. A solid propellant composition consisting essentially of a cured intimate mixture of from about 45% to about 90% by weight of a solid inorganic oxidizing salt; from about 55% to about 10% by weight of a binder material consisting essentially of a polyester resin consisting essentially of the condensation product of diethylene glycol, adipic acid and maleic anhydride, heteropolymerized with a mixture of n-butyl acrylate and methyl acrylate; and from about 0.5% to about 5% by weight of a mixture of bentonite clay and dodecyl amine.

11. A solid propellant composition consisting essentially of a cured intimate mixture of from about 45% to about 90% by weight of a solid inorganic oxidizing salt; from about 55% to about 10% by weight of a binder material consisting essentially of a polyester resin consisting essentially of the condensation product of diethylene glycol, adipic acid and maleic anhydride, heteropolymerized with a mixture of n-butyl acrylate and methyl acrylate; and from about 0.5% to about 5% by weight of ethyl silicone.

12. A solid propellant composition consisting essentially of a cured intimate mixture of from about 45% to about 90% by weight of a solid inorganic oxidizing salt; from about 55% to about 10% by weight of a binder material consisting essentially of a polyester resin consisting essentially of the condensation product of diethylene glycol, adipic acid and maleic anhydride, heteropolymerized with a mixture of n-butyl acrylate and methyl acrylate; and from about 0.5% to about 5% by weight of calcium silicate.

13. A solid propellant composition consisting essentially of a cured intimate mixture of from about 45% to about 90% by weight of a solid inorganic oxidizing salt; from about 55% to about 10% by weight of a binder material consisting essentially of a polyester resin consisting essentially of the condensation product of diethylene glycol, adipic acid and maleic anhydride heteropolymerized with a mixture of n-butyl acrylate and methyl acrylate; and from about 0.5% to about 5% by weight of ethyl silicate.

References Cited in the file of this patent

UNITED STATES PATENTS

| | | |
|---|---|---|
| 1,070,836 | O'Brien | Aug. 19, 1913 |
| 2,159,234 | Taylor | May 23, 1939 |
| 2,255,313 | Ellis | Sept. 9, 1941 |
| 2,388,319 | Fuller | Nov. 6, 1945 |
| 2,443,613 | Fuller | June 22, 1948 |
| 2,443,735 | Kropa | June 22, 1948 |
| 2,472,963 | Singleton et al. | June 14, 1949 |
| 2,479,828 | Geckler | Aug. 23, 1949 |
| 2,485,294 | Kropa | Oct. 18, 1949 |

FOREIGN PATENTS

| | | |
|---|---|---|
| 248,098 | Great Britain | Mar. 1, 1926 |
| 579,057 | Great Britain | July 22, 1946 |